UNITED STATES PATENT OFFICE.

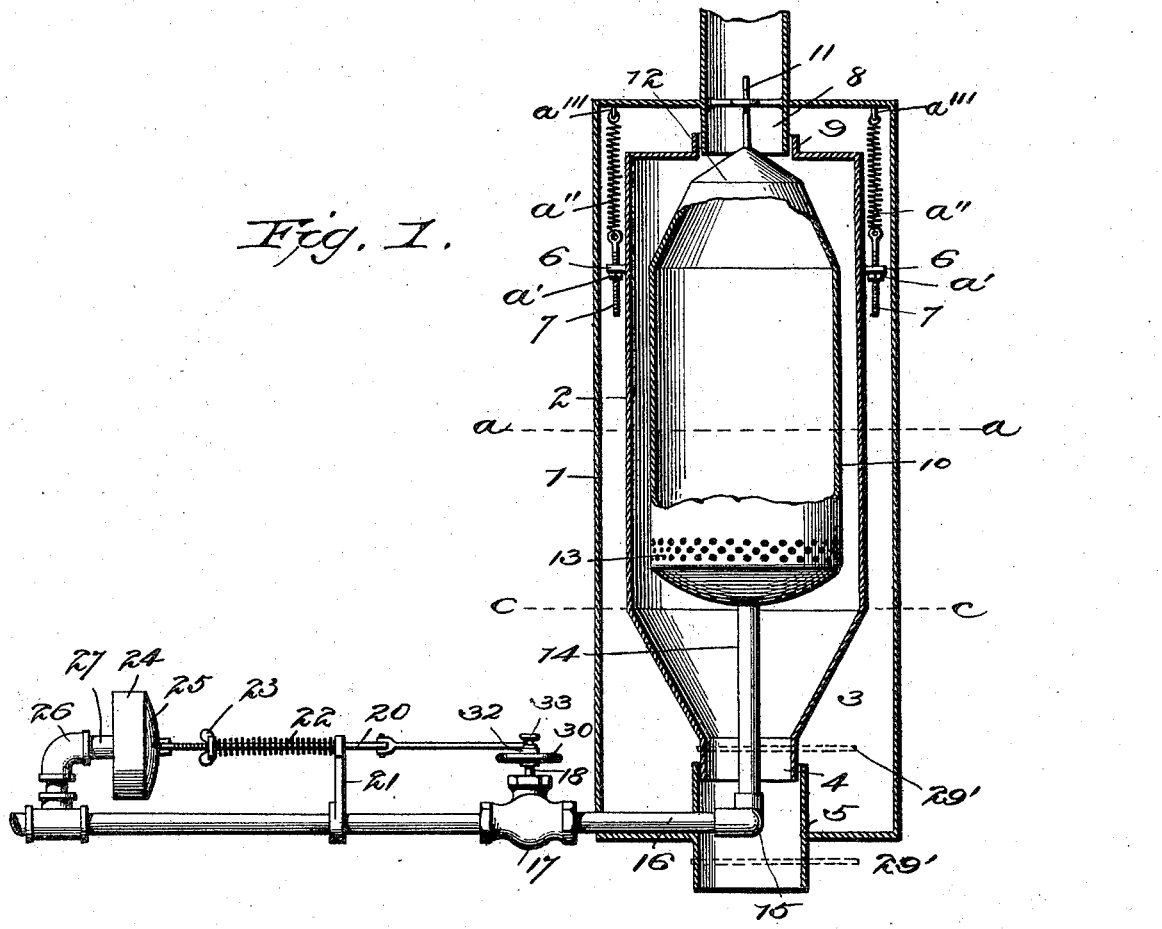

HARVEY D. PRATT, OF GAYLORD, KANSAS.

WHEAT STEAMER AND TEMPERER.

SPECIFICATION forming part of Letters Patent No. 582,087, dated May 4, 1897.

Application filed July 18, 1896. Serial No. 599,730. (No model.)

*To all whom it may concern:*

Be it known that I, HARVEY D. PRATT, a citizen of the United States, residing at Gaylord, in the county of Smith and State of Kansas, have invented certain new and useful Improvements in Wheat Steamers and Temperers; and I do hereby declare the following to be a full, clear, and exact description of the invention, such as will enable others skilled in the art to which it appertains to make and use the same.

This invention relates to improvements, as hereinafter set forth, in wheat-steamers.

In the drawings, Figure 1 represents an elevation, partly in section, of my improved device. Fig. 2 represents a section on the line *a a* of Fig. 1.

The object of my invention is to produce an automatically-operating device for steaming and tempering and feeding wheat to flour-mills.

1 represents the case or cabinet in which the steamer is inclosed and supported.

2 is a vertical outer cylinder having a reverse conical base 3 and a cylindrical bottom mouth 4, which latter has vertical guide-bearing in a vertical tube or sleeve 5, supported in the base of the casing or cabinet 1 and constituting the wheat-discharge spout. The upper portion of this outer cylinder has lateral lugs or shoulders 6 6, with which are suitably connected the lower ends of a series or plurality of eyed and threaded rods 7 7, whose upper ends are connected with the lower ends of a series of springs *a''*, whose upper ends are connected with eyes *a'''* in the top of the casing, said rods being adjustably secured at their lower ends to the lugs 6 by nuts *a'*, thereby elastically suspending, with capability of adjusting the power of the springs, said outer cylinder within said casing, so as to allow of the automatic vertical reciprocation of said cylinder as desired.

8 represents a short vertical wheat feed-tube depending from the top of the casing and which also serves as a guide for the outer cylinder in its vertical movements, the tubular guide-neck 9 of said cylinder surrounding said feed-tube 8, as shown.

10 represents the inner or steam cylinder. This is suspended from the top of the casing by a rod 11 and has a conical top 12 and a circumferential series of steam-exits 13 at or near its base.

14 represents a vertical length of steam-supply pipe connecting at its upper end with the bottom of said inner cylinder, so as to supply steam thereto, the lower end of said steam-pipe connecting by a T 15 with a horizontal steam-supply pipe 16, connecting with any suitable source of supply, (not shown,) and also with a used or waste steam return pipe 28.

For the purpose of regulating and maintaining an equable supply of steam to the apparatus I employ a series of devices which I will now describe.

17 is a globe-valve connected with the steam-supply pipe 16, 18 the valve-stem, and 30 a hand-wheel, with which latter is connected a valve-actuating rod or piston 20 and supported in an eyed-rod 21 and encircled by a spring 22, having end bearing, respectively, against said rod 21 and against a thumb-screw 23, having bearing on said piston-rod 20.

24 is a copper cylinder having spring-heads 25, with which is connected the piston-rod 20. With this cylinder 24 the steam-supply pipe 16 connects by means of a joint 26 and branch 27. As shown in Fig. 2, the steam-supply pipe is branched at 28 to carry off condensed or waste steam and keep the supply of steam to the inner cylinder dry and hot, said return branch being guarded by a globe-valve 29.

29' represents a slide guarding the wheat-discharge opening in the discharge-spout 5. This slide is used when the rolls are not provided with a rigid feed.

The hand-wheels 30 31 are mounted on the stems of the globe-valves for operating and guarding, respectively, the steam-inlet and steam-exit pipes.

32 represents a slotted slide or lever connected with the hand-wheel 30, and 33 represents a thumb-screw to hold the wheel-actuating lever 32 in position. With this lever 32 one end of the piston is connected, so as to actuate said lever and consequently actuate the hand-wheel 30, and therethrough regulate the degree of opening of the globe-valve connected therewith to regulate the supply of steam. By loosening the thumb-screw 33 and turning the hand-wheel 30 the steam-inlet valve is opened to the necessary degree to supply the requisite amount of steam to do the work when the steam is at thirty pounds, for instance. The spring on the piston-rod is then adjusted so as to just balance the thirty pounds pressure in the copper cylinder 24 and hold the cylinder-heads about straight. The thumb-screw is then tightened down onto the eyed or slotted lever 32, which connects with the piston-rod. The steam then enters the copper cylinder. As the steam rises above thirty pounds the cylinder-heads are pressed out, thereby pushing the piston-rod, which then closes the valve and shuts off sufficient steam to overcome the extra pressure. By this means I insure an even flow of steam under varied pressure. When the pressure falls below thirty pounds, the spring 23 on the piston-rod presses the heads of the copper cylinder in, thereby giving the piston-rod a reverse motion, which opens the valve. This construction and arrangement insures a constant and even supply of steam to the wheat-steamer under all circumstances and under all variations of pressure of the steam. When the live steam has fulfilled its mission of heating the inner cylinder, it returns through the pipe 13 to the T 15, and from thence through the branch or return pipe 28. The return-valve 29 is then opened to the necessary degree to permit of the escape of the exhaust or used steam. The slotted lever 32 can be lengthened or shortened to regulate the movement of the steam-inlet valve, so as to automatically open or close the valve as the steam rises or falls. The feed device being opened, the outer cylinder rises. The wheat to be steamed is then supplied to the outer cylinder through the feed-tube 8, passing down the space between the inner, steam, and the outer cylinder, and filling the funnel-bottom to the desired point. Steam is at the same time supplied to the inner cylinder and passes therefrom in minute particles through the openings in the lower part thereof, and ascending through the wheat as it passes down in a thin stream past said openings into the base or reverse cone-shaped bottom of the outer cylinder. By this arrangement the wheat is thoroughly, completely, and evenly steamed and tempered instantaneously, and the choking of the cylinder and the packing of the wheat prevented. As a sufficient quantity of the wheat descends to fill the funnel-shaped bottom of the outer cylinder to the line c the cylinder descends by the weight of the wheat and shuts off the wheat to the quantity being ground, the elasticity of the springs allowing it to, thereby closing the outer tube 9 down onto the conical-shaped top of the inner cylinder. The springs also allow the cylinder to descend and entirely shut off the flow of wheat when the mill stops. This is caused by the extra amount of wheat which runs in and fills the cylinder above the point c. The springs make the steamer automatic in operation, in stopping, and in starting.

The wheat to be steamed flows in constantly, and the springs connected with the outer cylinder serve to keep said cylinder on a balance and maintain a uniform supply of steamed wheat in the funnel bottom, and the steamed wheat also flows in a constant and steady stream out through the bottom of the apparatus to be ground. At the same time, the steam-supply valve being opened sufficiently to supply the necessary amount of steam, as heretofore explained, the thumb-screw is tightened down on the slotted lever, which being connected with the piston-rod and held fast on the hand-wheel of the globe-valve, the other end of the piston-rod being held in contact with the head of the copper cylinder by the spring on the piston-rod, the action of the cylinder-heads is transmitted to the piston-rod, which in turn automatically opens and closes the globe-valve and insures the supply, in a uniform flow and under varied pressures, of the requisite amount of steam to the inner cylinder.

It will thus be seen that by my apparatus there is a constant flow of wheat down through the apparatus between the inner steam-supplying cylinder and the outer cylinder. The wheat as it passes down between these two cylinders is, in its individual kernels, separately subjected to the action of the steam entering the outer cylinder, so that each kernel is individually subjected to the action of the steam. The wheat as it descends in a constant and steady stream into the funnel bottom of the outer cylinder maintains a uniform supply in said funnel bottom, thereby maintaining an equilibrium and holding the inner cylinder evenly balanced in position to admit of the constant flow of wheat down therein. Further, by means of the steam-gaging apparatus described a uniform supply and pressure of steam in and to the inner cylinder is at all times maintained whatever may be the pressure at the supply-point. The exhaust-steam automatically discharges and only live steam at a uniform temperature is at all times supplied to and contained within the steaming-cylinder.

By inclosing the cylinders in a surrounding cabinet or case, as described, to which access may be had by means of suitable doors, the steam heat is retained therein and the impact of external air to the outer cylinder is prevented.

Having thus described my invention, what I claim is—

1. A wheat steamer and temperer, consisting of an inclosing cabinet, an outer wheat-receiving cylinder having at its top a tubular neck, spring-hangers suspending said outer cylinder from the top of said cabinet so as to support said cylinder in said cabinet with capability of automatically vertically reciprocating therein, an inner steam-cylinder rigidly supported on said cabinet and within the outer cylinder and having a conical top and, at its base, a circumferential series of steam-discharges, wheat supply and discharge openings at the top and bottom, respectively, of said outer cylinder, and an automatic steam-supply connected with the said inner cylinder, substantially as and for the purpose set forth.

2. A wheat steamer and temperer, consisting of a close external cabinet, a slide-guarded discharge-spout at the base thereof, and a supply-opening at the top, a wheat-receiving cylinder having at its top a central tubular neck and a reverse conical base, rods adjustably connected with said cylinder and springs connecting said rods and the cabinet for suspending said cylinder from said cabinet with capability of automatic vertical reciprocation therein, a cylinder of less circumference than the outer cylinder and having a circumferential series of openings in its lower portion and a conical upper portion, a steam-supply pipe and governor connected with said steam-supply pipe, substantially as and for the purpose set forth.

3. A wheat-steamer consisting of an outer, close, cabinet, a steam receiving and discharging cylinder stationary therein, a steam-supply connected with said cylinder, a cylinder inclosing said steam-cylinder and of greater circumference than the steam-cylinder, said inclosing cylinder being elastically suspended within the cabinet so as to vertically reciprocate, automatically, therein and having top and bottom openings, substantially as and for the purpose set forth.

4. A wheat steamer and temperer, comprising an inner cylinder having a conical apex and, at its bottom, a circumferential series of steam-outlets, and an automatically vertically reciprocating outer cylinder having at its upper portion a wheat-inlet, between which two cylinders the wheat is adapted to pass down; said inner cylinder being adapted to heat said outer cylinder and also uniformly steam and heat the kernels of wheat passing down between said two cylinders, a live-steam-supply pipe connected with the bottom of said inner cylinder and a condensed-steam-discharge pipe also connected with said inner cylinder, and suitable valve-guarded pipes connected therewith, substantially as and for the purpose set forth.

5. A wheat steamer and temperer, consisting of an outer cylinder having a funnel bottom, and inner cylinder having a series of openings in its lower portion, a steam-supply pipe and a steam-exhaust pipe connected with said inner cylinder, globe-valves connected with said supply and exhaust pipes, a steam-supply, an elastic-headed cylinder, or steam-chest connected with said steam-supply, a piston connected with said steam-chest and also having adjustable connection with the valve regulating the supply of steam to the said inner cylinder, substantially as and for the purpose set forth.

6. A wheat steamer and temperer, consisting of an outer cylinder adapted to receive the wheat to be treated and having capability of independent vertical reciprocation, an inner steam-receiving cylinder having a circumferential series of outlets at its bottom portion, a live-steam inlet and an exhaust-steam outlet connected with said inner cylinder, valves guarding said inlet and outlet, respectively, known means for actuating said outlet-valve, a hand-wheel connected with the valve-rod of the inlet-valve, a slotted lever connected therewith, a clamp-screw connecting said hand-wheel and slotted lever, a spring-actuated piston-rod connected with said slotted lever, a spring-headed steam-chest connected with said piston-rod and a steam-supply pipe connected, respectively, with said steam-chest and with the valve guarding the pipe supplying live steam to said inner cylinder, substantially as and for the purpose set forth.

In testimony whereof I affix my signature in presence of two witnesses.

HARVEY D. PRATT.

Witnesses:
A. D. HANON,
T. S. DAVIS.